US008075819B2

(12) United States Patent
Seger

(10) Patent No.: US 8,075,819 B2
(45) Date of Patent: Dec. 13, 2011

(54) TOOLING SYSTEM FOR THERMOFORMING AND TRIMMING A HEATED SHEET OF MATERIAL TO FORM A MOLDED PART

(75) Inventor: Anthony C. Seger, Sidney, OH (US)

(73) Assignee: Tooling Technology, LLC, Ft. Loramie, OH (US)

( * ) Notice: Subject to any disclaimer, the term of this patent is extended or adjusted under 35 U.S.C. 154(b) by 0 days.

(21) Appl. No.: 12/931,594

(22) Filed: Feb. 4, 2011

(65) Prior Publication Data
US 2011/0148009 A1 Jun. 23, 2011

Related U.S. Application Data

(62) Division of application No. 12/387,104, filed on Apr. 28, 2009, now Pat. No. 7,901,199.

(51) Int. Cl.
*B29C 51/32* (2006.01)
(52) U.S. Cl. ........ 264/101; 425/388; 425/407; 425/412; 425/292; 264/553
(58) Field of Classification Search .................. 264/201, 264/553; 425/412, 101, 553, 384, 388, 289, 425/292, 310
See application file for complete search history.

(56) References Cited

U.S. PATENT DOCUMENTS

| | | | |
|---|---|---|---|
| 3,342,915 A | 9/1967 | Wanderer | |
| 3,561,057 A | 2/1971 | Butzko | |
| 3,832,102 A | 8/1974 | Alroy | |
| 4,201,823 A * | 5/1980 | Russell | 428/194 |
| 4,328,067 A | 5/1982 | Cesano | |
| 4,755,129 A | 7/1988 | Baker et al. | |
| 5,076,880 A | 12/1991 | Spengler et al. | |
| 5,813,355 A | 9/1998 | Brown et al. | |
| 5,843,366 A | 12/1998 | Shuert | |
| 5,980,231 A | 11/1999 | Arends et al. | |
| 6,379,606 B1 | 4/2002 | Chun et al. | |
| 6,852,268 B1 * | 2/2005 | Valyi et al. | 264/510 |
| 6,929,711 B2 * | 8/2005 | Benninger | 156/212 |
| 7,045,086 B2 | 5/2006 | Fitzell, Jr. | |
| 7,101,503 B2 | 9/2006 | Spengler et al. | |
| 7,140,863 B2 | 11/2006 | Koppenhofer | |
| 7,799,265 B2 * | 9/2010 | Nakazato et al. | 264/547 |
| 2005/0220925 A1 | 10/2005 | Inada et al. | |
| 2006/0038325 A1 * | 2/2006 | Ostrander et al. | 264/553 |
| 2009/0232930 A1 | 9/2009 | Suzuki et al. | |

* cited by examiner

*Primary Examiner* — Joseph Del Sole
*Assistant Examiner* — Nahida Sultana
(74) *Attorney, Agent, or Firm* — Jacox, Meckstroth & Jenkins

(57) ABSTRACT

An upper press platen supports an upper mold member slidable vertically within a surrounding upper trim frame. A lower press platen supports a lower trim frame surrounding a lower mold member slidable vertically within the lower trim frame. The lower mold member defines a cavity connected to a vacuum source, and one or two heated sheets of material are positioned between the trim frames and mold members which are then closed to clamp peripheral portions of the sheets between the trim frames. The lower heated sheet is vacuum formed into the cavity and the sheets are fused together with heat and pressure to form a part which is then cooled. The mold members shift downwardly as a unit within the trim frames to shear the peripheral portions of the sheets from the part. The trimmed part and peripheral portions are removed after the trim frames and mold members open.

11 Claims, 4 Drawing Sheets

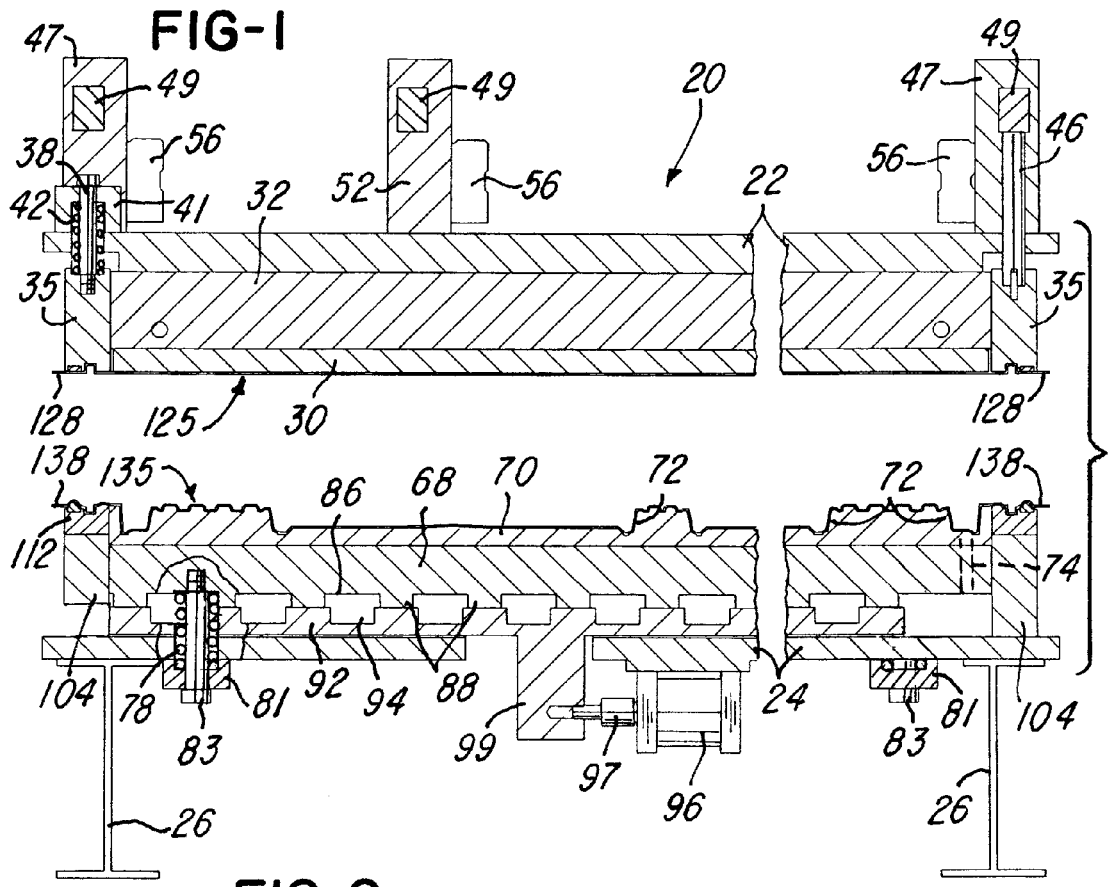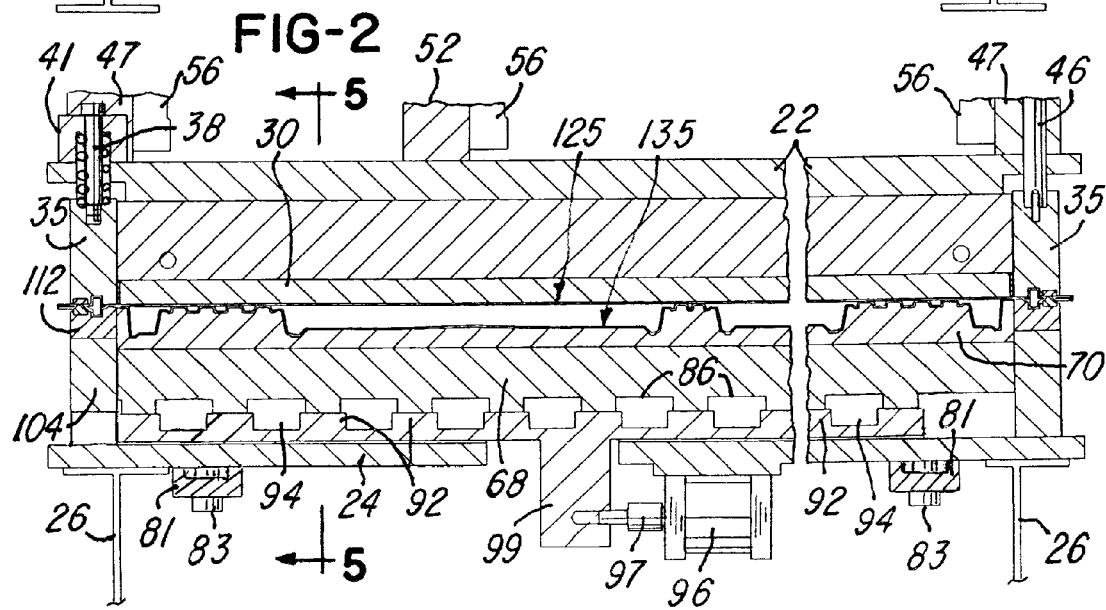

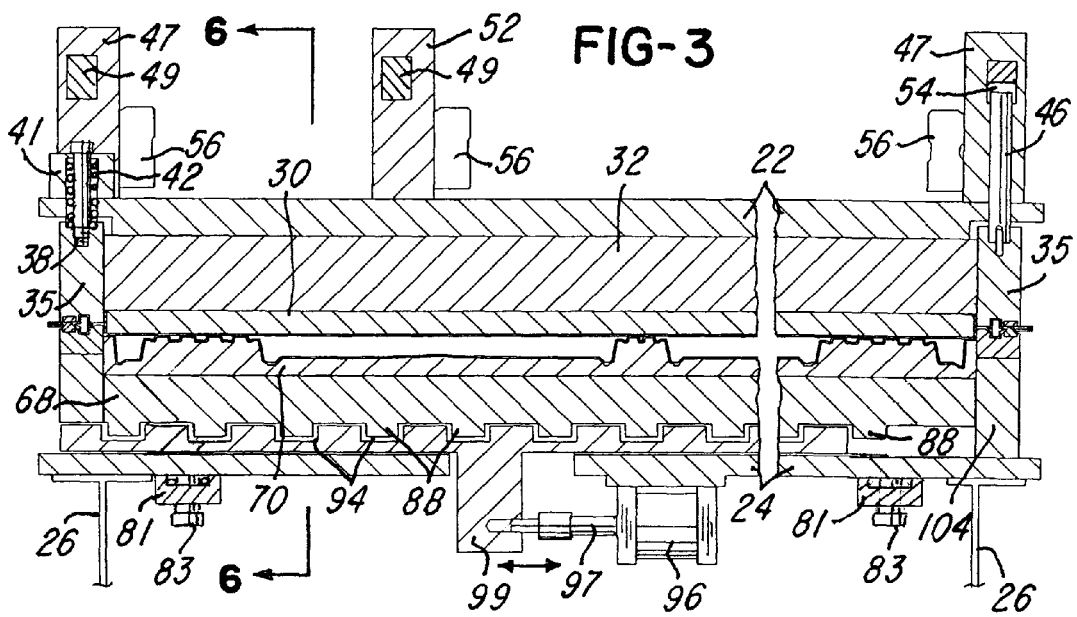
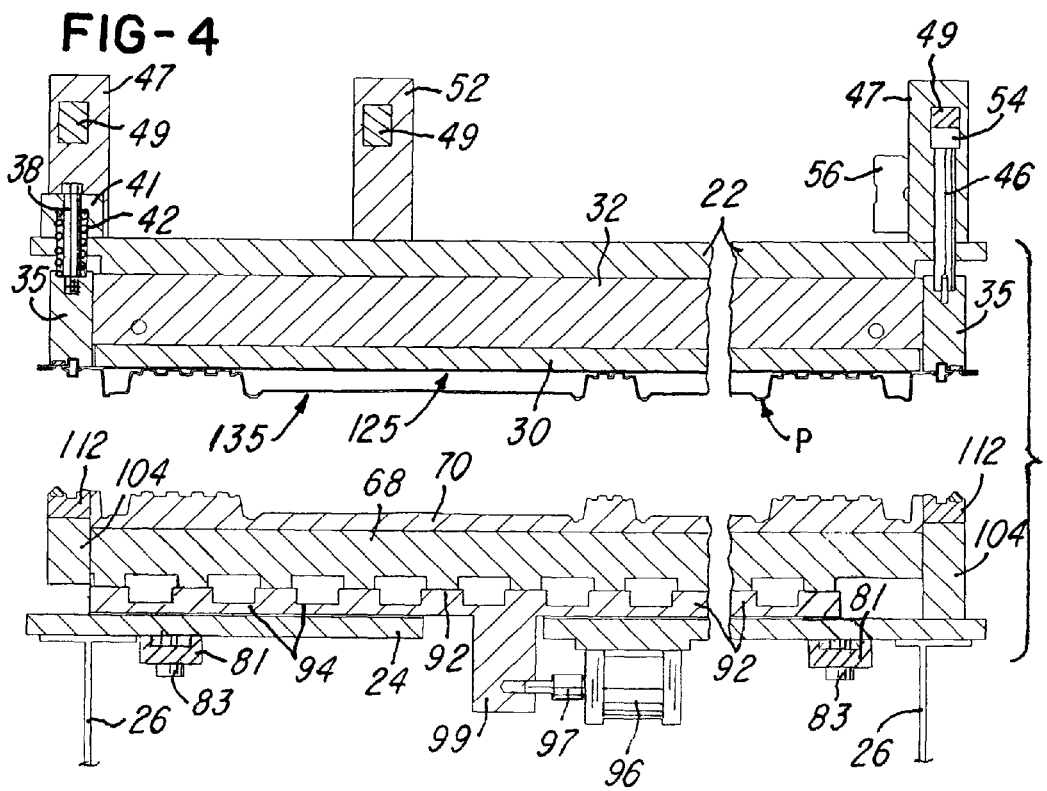

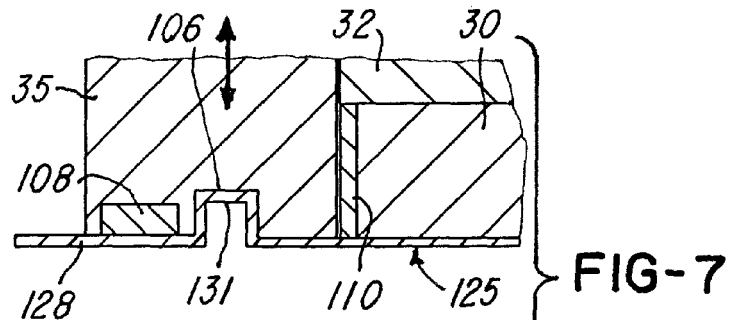
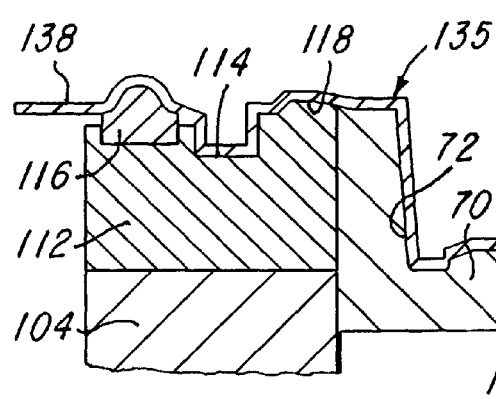
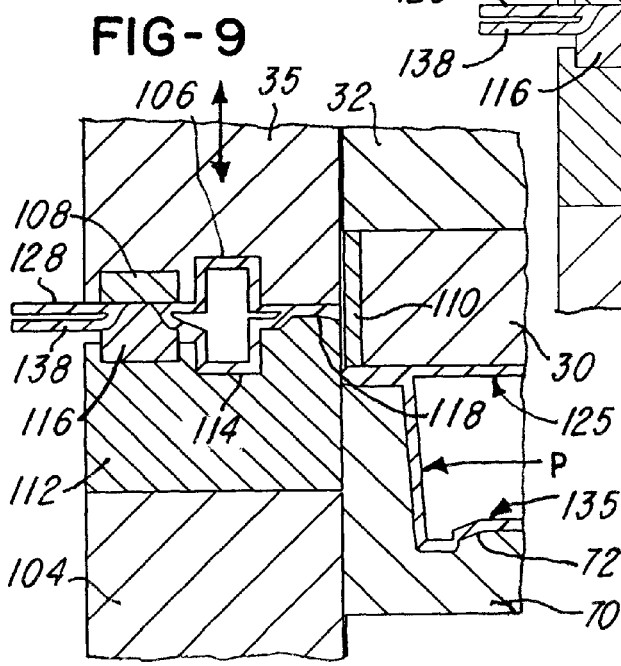

TOOLING SYSTEM FOR THERMOFORMING AND TRIMMING A HEATED SHEET OF MATERIAL TO FORM A MOLDED PART

RELATED APPLICATION

This application is a division of application Ser. No. 12/387,104, filed Apr. 28, 2009.

BACKGROUND OF THE INVENTION

In a thermoform tooling system for producing a vacuum-formed part, such as, for example, a twin-sheet thermoformed pallet as disclosed in U.S. Pat. No. 5,813,355, it is known to use a thermoforming method and apparatus such as disclosed in U.S. Pat. No. 5,843,366, the disclosure of which is herein incorporated by reference. Other forms of thermoforming apparatus and methods for producing a twin-sheet or single-sheet molded product or part are disclosed in U.S. Pat. No. 5,980,231, U.S. Pat. No. 6,379,606 and U.S. Pat. No. 7,045,086. As disclosed in U.S. Pat. No. 5,843,366, a pair of heat deformable or thermoplastic sheets each have peripheral edge portions gripped by a transfer clamping frame supported by rotary transfer wheel. The sheets and frames are indexed through an oven for heating the sheets to a predetermined temperature, for example, 400 degrees F. The heated sheets are then transferred to a vacuum molding apparatus where upper mold members or male molds are supported by a vertically movable upper platen and cooperate with a lower mold member or female mold and another male mold or plug mold which shift horizontally on a lower press platen to positions under the upper male molds.

After the first heated sheet is thermoformed, its clamping frame is released, and the empty frame cycles out of the way. The second clamping frame with a heated sheet cycles in and is thermoformed and then positioned above or below the first thermoformed sheet. The male and female molds are then closed to fuse the upper sheet to the lower sheet to form a twin-sheet plastic pallet or part. After the twin-sheets are fused together, the mold opens, and the combined twin-sheets are transferred by a single clamping frame to a station where the fused sheets are cooled. The sheets are then transferred to an unloading station where the single clamping frame is opened to release the fused twin-sheets forming the part. The combined twin-sheets and the connected peripheral edge portions, commonly referred to as offal, are manually transferred to a trimming station where the peripheral edge portions or offal are removed or cut from the part with a hand held router or by a steel trim die in a press or by a computer numerically controlled (CNC) router which moves around the molded part.

It has been found that the trimming operation of a thermoformed part, such as the twin-sheet thermoformed pallet, requires substantial time and labor, in addition to fixtures and equipment for trimming the peripheral portion or offal from the part and to obtain a precision finished outer edge on the part. For example, the use of a CNC router requires an additional mold or fixture to hold the part securely in its formed shape. The part is held in place by either manually clamping the part to a fixture or by a vacuum which requires that the base of the fixture be constructed to allow the fixture to be connected to a vacuum pump in order to hold the part securely. When a steel trim die is used, the trim die is installed in a trim press where the part is trimmed by a trim tool such as a steel rule die for simple flat cuts or a heavier steel die for more complex shapes or for a higher volume of parts.

SUMMARY OF THE INVENTION

The present invention is directed to an improved thermoform tooling system which incorporates a trimming operation with the thermoform mold for efficiently forming and trimming a sheet of heat deformable material to form a molded part. The tooling system of the invention is ideally suited for producing twin-sheet thermoformed parts, for example, as disclosed in above-mentioned U.S. Pat. No. 5,813,355. The tooling system also eliminates the needs for additional molds, fixtures or trim dies to trim each part with a CNC router or with a separate trim press. Thus there is no additional capital expenditure for a CNC router system or a trim press or for programming the CNC router. Also eliminated is the repair of damaged fixtures or the replacement of vacuum seals on trim fixtures, all of which cause a loss in production of parts. In addition, the thermoformed tooling system of the invention eliminates the need for an operator or operators to place a formed part manually onto a fixture for a CNC router or onto a trim press and the possibility of injury to the operator. The tooling system of the invention further reduces the overall cycle time for producing finished parts by eliminating the secondary operation of separately trimming each molded part.

In accordance with the invention, an upper press platen is positioned above a lower press platen, and upper and lower mold members are supported by the upper and lower platens with at least one of the mold member defining a cavity according to the shape of the part. A lower trim frame closely surrounds the lower mold member and is mounted on the lower platen, and the lower mold member is slidable vertically within the lower trim frame. An upper trim frame closely surrounds the upper mold member and is connected to the upper platen with the upper mold member slidable vertically within the upper trim frame.

The upper trim frame and lower trim frame are positioned in opposing relation for clamping therebetween a peripheral portion of a single heated sheet or peripheral portions of heated twin sheets in response to movement of the mold members from an open position to a closed position. The cavity is connected to a vacuum source to form the heated sheet into the cavity. After a heated sheet is formed into the cavity and cooled or twin sheets are formed and fused together and cooled to form a part, the upper and lower mold members move or shift downwardly as a unit within the upper and lower trim frames to shear the thermoformed part from the peripheral portion of the sheet(s) clamped between the trim frames. After the shearing or trimming operation, the mold members open so that the trimmed part may be conveniently removed from the mold members, and the separated peripheral portion of one or both sheets may be removed from the trim frames.

Other features and advantages of the invention will be apparent from the following description, the accompanying drawings and the appended claims.

BRIEF DESCRIPTION OF THE DRAWINGS

FIG. 1 is a vertical section of a thermoform tooling system constructed in accordance with the invention and showing the trim frames and mold members in an open position with twin vacuum-formed heated sheets on the mold members;

FIG. 2 is a vertical section similar to FIG. 1 and showing the trim frames and mold members in a closed position for fusing the upper sheet to the lower sheet;

FIG. 3 is a vertical section similar to FIG. 2 and showing the fused twin sheets after the trimming operation;

FIG. 4 is a vertical section similar to FIG. 1 with the trim frames and mold members in the open position and the trimmed part and peripheral portions carried by the upper mold member;

FIG. 7 is an enlarged fragmentary section of the tooling system in the open position shown in FIG. 1;

FIG. 8 is an enlarged fragmentary section of the tooling system during the twin-sheet fusing operation shown in FIG. 2; and FIG. 9 is an enlarged fragmentary section of the tooling system shown in FIG. 3 after the trimming operation.

DESCRIPTION OF THE ILLUSTRATED EMBODIMENT

Figure 5:
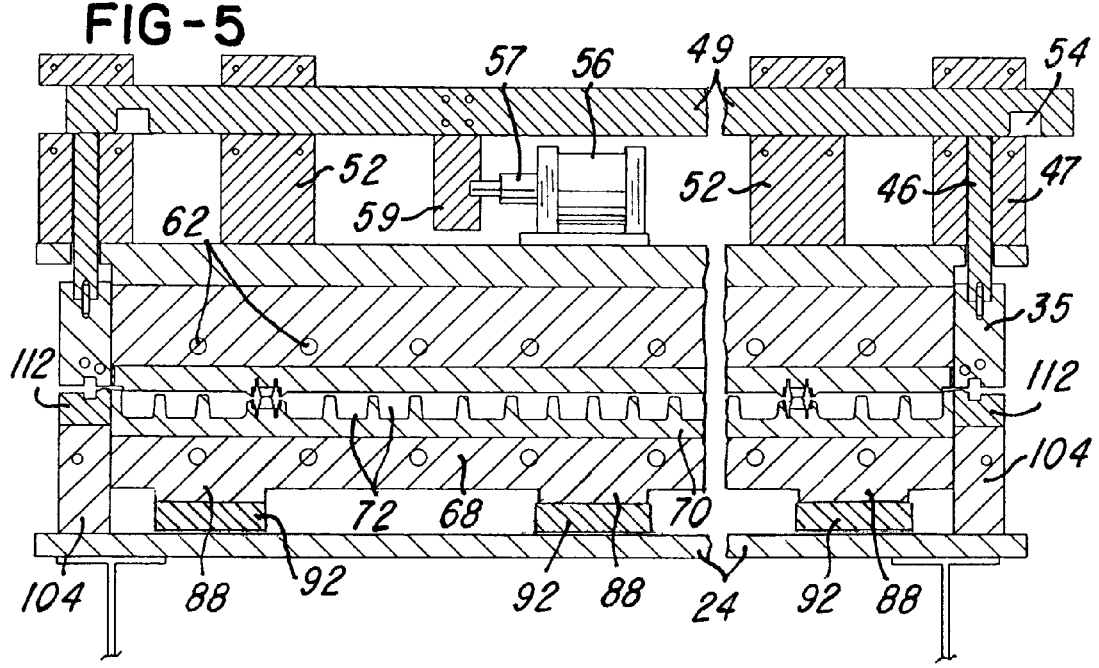
FIG. 5 is a vertical section of the closed mold members, taken generally on the line 5-5 of FIG. 2 and without sheets of thermoformable material.

Referring to FIG. 1, a thermoform tooling system 20 includes an upper platen 22 above a lower platen 24 which is supported by parallel spaced beams 26. The upper platen 22 is connected, in a conventional manner, to a fluid actuated cylinder (now shown) of a press for movement between an open position (FIG. 1) and a closed position (FIG. 2), and the platens 22 and 24 are preferably formed of aluminum. The upper platen 22 supports and carries an upper mold plate or member 30 secured to the bottom of a cooling plate 32, both of which are formed of aluminum. The upper platen 22 also supports an aluminum upper trim frame 35 which closely surrounds the mold member 30 and cooling plate 32 and is slidable vertically relative to the mold member 30 and plate 32. The trim frame 35 is supported from the upper platen 22 by a series of peripherally spaced bolts 38 (FIG. 1) which extend through block members 41 mounted on the platen 22 and are threaded into the trim frame 35. A compression spring 42 surrounds each bolt 38, and the springs normally bias the trim frame 35 downwardly relative to the upper platen 22 and mold members 30 and 32 to the home position shown in FIG. 1.

Figure 6:
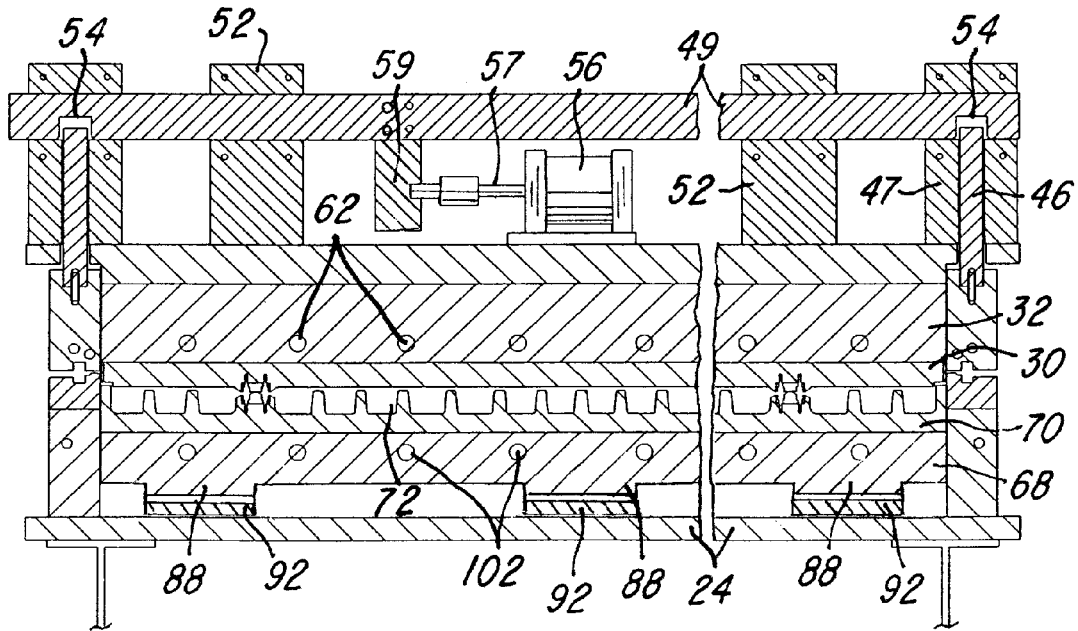
FIG. 6 is a vertical section similar to FIG. 5 and taken generally on the lines 6-6 of FIG. 3.

Referring to FIGS. 1 and 5, a set of peripherally spaced pins or rods 46 are also connected to the upper trim frame 35, and each rod 46 extends upwardly into a corresponding support block 47 secured to the top of the upper platen 22. The upper ends of the rods 46 are normally blocked by a set of laterally extending or horizontal blocking bars 49, and each bar 49 extends through aligned openings within the support blocks 47 and intermediate support blocks 52. Each blocking bar 49 is supported for laterally sliding movement within the support blocks 47 and 52 between a blocking position (FIGS. 1 & 5) blocking upward movement of the rods 46 and a released position (FIG. 6) when the rods 46 are free to move upwardly within corresponding cavities 54 within each blocking bar 49. Each blocking bar 49 is shifted laterally between its blocking and release positions by a corresponding fluid cylinder 56 (FIG. 5) each having a piston rod 57 connected to a bracket 59 secured to the blocking bar 49. As shown in FIGS. 1, 5 and 6, the cooling plate 32 supporting the mold plate 30 has a series of interconnected cooling passages 62 through which a cooling fluid or water is pumped when required.

Referring to FIGS. 1 and 2, the lower platen 24 supports a lower cooling plate 68 and a lower mold member 70 which has a set of cavities 72 according to the configuration of the part to be thermoformed in the tooling system 20. A series of vacuum passages 74 (FIG. 1) extend from the cavities 72 through the mold member 70 and cooling plate 68 and are connected to a vacuum source. The cooling plate 68 and the mold member 70 are normally biased upwardly from the lower platen 24 by a set of spaced compression springs 78 each of which extends within vertically aligned cavities formed within the cooling plate 68 and a pad 81 secured to the bottom of the lower platen 24. A bolt 83 extends vertically through each pad 81 and corresponding compression spring 78 and is threaded into the cooling plate 68 to limit upward movement of the cooling plate 68 and mold member 70 relative to the lower platen 24.

The bottom surface of the cooling plate 68 has laterally spaced recesses 86 which define therebetween laterally spaced pads 88. A set of laterally extending and parallel spaced elongated blocking bars 92 are supported by the lower platen 24 for longitudinally sliding movement, and each bar 92 has longitudinally spaced recesses or cavities 94. Each blocking bar 92 is moved or shifted laterally or horizontally by a corresponding fluid cylinder 96 (FIG. 1) having a piston rod 97 connected to an actuator bracket or block 99 projecting downwardly from the bar 92. When the piston rod 97 is retracted, the blocking bar 92 is in its normal blocking position (FIGS. 1 & 2) supporting the pads 88 on the cooling plate 68. When the piston rod 97 is extended, the blocking bar 92 shifts laterally or horizontally to a non-blocking or released position (FIG. 3) so that the cooling plate 68 and mold member 70 may shift downwardly relative to the lower platen 24 against the bias of the compression springs 78. As shown in FIG. 6, the lower cooling plate 68 also has interconnected fluid cooling passages 102 through which a cooling fluid or water is pumped at selected times.

The lower mold member 70 and cooling plate 68 are closely surrounded by a lower trim frame 104 mounted on the lower platen 24 and within which the mold member 70 and cooling plate 68 may slide vertically. Referring to the enlarged section view of FIG. 7, the bottom surface of the aluminum upper trim frame 35 has a peripherally extending recess or downwardly facing groove 106 and supports a peripherally extending steel pinch strip or pad 108. The aluminum upper mold plate or member 30 supports a peripherally extending steel wear frame 110. The lower trim frame 104 includes a steel top trim frame 112 having a peripherally extending recess or groove 114 and supporting a peripherally extending steel pinch strip or pad 116. The steel trim frame 112 also has a peripherally extending contoured pinch surface or ridge 118.

In operation of the thermoforming system 20 for producing a thermoformed product or part, a heated vacuum formed upper sheet 125 (FIG. 1) of heat deformable or thermoplastic material is carried by the upper mold plate or member 30, and a peripheral portion 128 of the sheet 125 includes a peripherally extending inverted U-shaped portion 131 (FIG. 7) which projects into the groove 106 to retain the sheet. While the heated sheet 125 is shown as being substantially flat under the mold member 30, it is to be understood that the mold member 30 may have one or more cavities, and the heated sheet 125 would be vacuum-formed into the cavities. A vacuum-formed heated lower sheet 135 (FIGS. 1 & 7) of heat deformable or thermoplastic material is supported by the lower mold member 70 and is vacuum-formed into the cavities 72 within the lower mold member. The lower sheet 135 has a peripheral portion 138 which extends over the ridge 118 and into the groove 114 and over the pinch pad 116 of the steel trim frame 112. The vacuum-formed sheets 125 and 135 are heated to a predetermined temperature, for example, about 400° F., for the vacuum forming process.

Referring to FIGS. 2 and 8, when it is desired to fuse the upper sheet 125 to the lower sheet 135, the upper platen 22 is lowered by the press until the peripheral portions 128 and 138 of the sheets are pinched together by the trim frames 35 and 112, as shown in FIG. 2. In this position, the upper sheet 125 and lower sheet 135 are knitted or fused together with heat and pressure and between the upper mold member 30 and lower mold member 70, and the peripheral portions 128 and 138 are fused together as shown in FIG. 8. The fused together sheets cool to a lower temperature, for example, within the range of 150° to 180°, preferably with the aid of cooling fluid circulating within the passages 62 and 102 and/or with the aid of circulating air fans directed against the platens 22 and 24 and trim frames 35 and 104.

After the fusing operation, the upper blocking bars 49 and the lower blocking bars 92 are then shifted laterally by the corresponding fluid cylinders 56 and 96. The upper platen 22, cooling plate 32 and upper mold member 30 are then shifted downwardly by a small amount within the trim frame 35 (FIGS. 3 and 6), and the downward movement of the upper mold member 30 forces the lower mold member 70 and cooling plate 68 downwardly against the compression spring 78. This downward movement of the upper mold plate 30 and lower mold plate 70 within the trim frames 35 and 104 causes the steel trim frame 110 to cooperate with the steel trim frame 112 to shear the fused sheets 125 and 135 from the fused peripheral portions 128 and 138 of the sheets, as shown in FIG. 9, to produce the thermoformed part P having a precise and clean outer edge surface.

When the upper platen 22 and upper mold member 30 and cooling plate 32 move upwardly and return to the normal open position (FIG. 4), the springs 78 return the lower mold member 70 and cooling plate 68 back to their upper home position, after which the blocking member 92 is shifted to its blocking position by actuation of the cylinder 96. When the upper platen 22 returns to its upper home position (FIG. 4), the springs 42 shift the upper trim frame 35 downwardly on the upper mold member 30 and cooling plate 32 to the home position (FIG. 4). Each blocking bar 49 is then returned to its blocking home position (FIG. 5) by actuation of the corresponding cylinder 56. As shown in FIG. 4, the fused together trimmed sheets forming the part P are carried upwardly by the upper mold member 30 along with the separated and fused together peripheral portions 128 and 138 of the sheets. In this position, the trimmed part P and the peripheral edge portions may be conveniently removed from the upper mold member 30 and upper trim frame 35.

From the drawings and the above description, it is apparent that a thermoform tooling system constructed in accordance with the invention, provides desirable features and advantages. As a primary advantage, a heated single sheet or heated twin sheets are completely thermoformed and trimmed in the tooling system, thereby eliminating the need for a secondary trimming station and operation at a remote site. As a result, the tooling system eliminates all of the problems of a secondary trimming station and operation as described above in the Background of the Invention. In addition, the thermoforming and trimming operations in the tooling system may be performed in substantially the same cycle time as required to heat a sheet at a separate heating station, Usually, the time period required for heating a sheet is the longest time period and determines the cycle time for operating a thermoforming apparatus such as disclosed in above-mentioned U.S. Pat. No. 5,843,366.

While the method and form of thermoforming system or apparatus herein described constitutes a preferred embodiment of the invention, it is to be understood that the invention is not limited to the precise method and form of apparatus described, and that changes may be made therein without departing from the scope and spirit of the invention as defined in the appended claims.

What is claimed is:

1. A method of efficiently thermoforming and trimming a part from a heated first sheet of heat deformable material, comprising the steps of
   forming an upper mold member and a lower mold member with at least one of the mold members defining a cavity therein,
   forming an upper trim frame closely surrounding the upper mold member and a lower trim frame closely surrounding the lower mold member,
   supporting the upper mold member and the upper trim frame with an upper platen with the upper mold member slidable within the upper trim frame,
   supporting the lower mold member and the lower trim frame with a lower platen and with the lower mold member slidable within the lower trim frame,
   locating the first sheet of material between the upper mold member and the lower mold member while the mold members are in an open position,
   moving the upper trim frame and the lower trim frame together to clamp a peripheral portion of the first sheet between the upper trim frame and the lower trim frame while moving the upper mold member and the lower mold member together to a close position,
   applying a suction within the cavity to thermoform the heated first sheet into the cavity while the peripheral portion of the first sheet is clamped between the trim frames to form the part,
   sliding the upper mold member and the lower mold member as a closed unit within the corresponding surrounding upper trim frame and the lower trim frame to shear the peripheral portion of the first sheet from the part, and
   moving the upper trim frame and upper mold member relative to the lower trim frame and lower mold member to the open position to provide for removing the trimmed part from the mold members and removing the peripheral portion of the first sheet from the trim frames.

2. A method as defined in claim 1 and including the step of locating a second sheet of heat deformable material adjacent the first sheet, fusing the first sheet and the second sheet together between the upper mold member and the lower mold member, and shearing peripheral portions of both the first and second sheets between the upper and lower trim frames to form a twin sheet part.

3. A method as defined in claim 2 and including its step of blocking downward movement of the upper platen and upper mold member within the upper trim frame while fusing the first sheet and second sheet together.

4. A method as defined in claim 1 and including the step of blocking downward movement of the lower mold member within the lower trim frame while the first sheet is thermoformed into the cavity.

5. A method of efficiently forming and trimming a heated sheet of heat deformable material to produce a molded part, said method comprising the steps of
   forming a lower press platen and an upper press platen with a lower mold member supported by the lower platen and an upper mold member supported by the upper platen and with at least one of the mold members defining a cavity therein, connecting a lower trim frame to the lower platen with the lower trim frame closely surrounding the lower mold member and with the lower mold member supported for sliding movement within the lower trim frame, connecting an upper trim frame to the upper platen with the upper trim frame closely surrounding the upper mold member and with the upper mold member supported for sliding movement within the upper trim frame, positioning the upper trim frame and the lower trim frame in opposing relation for clamping therebetween a peripheral portion of the heated sheet in response to movement of the lower mold member and the upper mold member from an open position to a closed position, extending at least one vacuum passage to the cavity within the one mold member and connecting the passage to a vacuum source to vacuum form the heated sheet into the cavity while the mold members are in the closed position to form the molded part, moving the upper mold member and the lower mold member as a unit within the upper trim frame and the lower trim frame while the mold members are in the closed position to shear the molded part from the peripheral portion of the sheet clamped between the trim frames before the mold members move to the open position to release the molded part, and biasing the upper trim frame downwardly from the upper platen to a clamping position while connecting the upper platen to the upper trim frame to permit downward movement of the upper platen and the upper mold member within the upper trim frame.

6. A method as defined in claim 5 and including the step of supporting a blocking member by the upper platen for lateral movement between a blocking position preventing upward movement of the upper trim frame relative to the upper platen and a release position permitting the downward movement of the upper platen and the upper mold member within the upper trim frame.

7. A method of efficiently forming and trimming a heated sheet of heat deformable material to produce a molded part, said method comprising the steps of forming a lower press platen and an upper press platen with the upper press platen positioned above the lower press platen, supporting a lower mold member by the lower platen and supporting an upper mold member by the upper platen with at least one of the mold members defining a cavity therein, positioning a lower trim frame closely surrounding the lower mold member with the lower mold member supported for vertical sliding movement within the lower trim frame, positioning an upper trim frame closely surrounding the upper mold member with the upper mold member supported for vertical sliding movement within the upper trim frame, positioning the upper trim frame and the lower trim frame in opposing relation for clamping therebetween a peripheral portion of the heated sheet in response to movement of the lower mold member and the upper mold member from an open position to a closed position, extending a vacuum passage to the cavity within the one mold member and connecting the passage to a vacuum source to vacuum form the heated sheet into the cavity while the mold members are in the closed position to form the molded part, moving the upper mold member and the lower mold member as a unit within the upper trim frame and within the lower trim frame to a trim position while the mold members are in the closed position to shear the molded part from the peripheral portion of the sheet clamped between the trim frames before the mold members move to the open position to release the molded part, biasing the lower mold member upwardly from the lower platen to a molding position, and biasing the upper trim frame downwardly from the upper platen to a clamping position.

8. A method as defined in claim 7 and including the steps of blocking downward movement of the lower mold member from the molding position, and releasing the blocking to permit downward movement of the lower mold member toward the lower platen.

9. A method as defined in claim 7 including the steps of blocking upward movement of the upper trim frame relative to the upper platen, and releasing the blocking to permit downward movement of the upper mold member from the upper platen.

10. A method as defined in claim 7 and including the steps of positioning a second heated sheet of heat deformable material adjacent the first said sheet of material to form twin sheets of material, fusing the twin sheets together between the upper mold member and the lower mold member before the mold members are movable as a unit within the upper trim frame and the lower trim frame to the trim position.

11. A method as defined in claim 7 and including the steps of supporting at least one blocking member by the lower platen for lateral movement between a first position blocking downward movement of the lower mold member from the molding position and a second position allowing downward movement of the lower mold member, and supporting at least one blocking member by the upper platen for lateral movement between a blocking position preventing upward movement of the upper trim frame relative to the upper platen and a release position permitting downward movement of the upper platen and the upper mold member within the upper trim frame.

* * * * *